Figure 4:
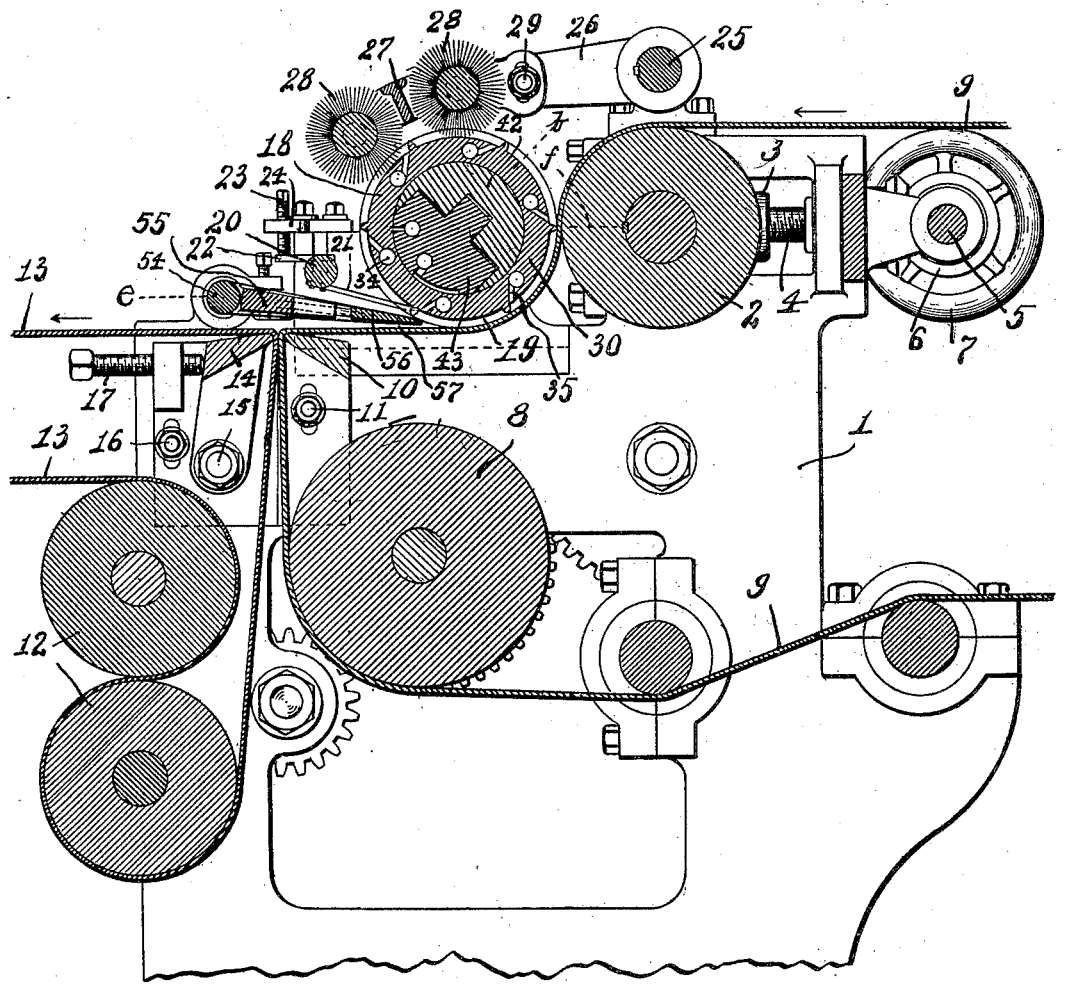

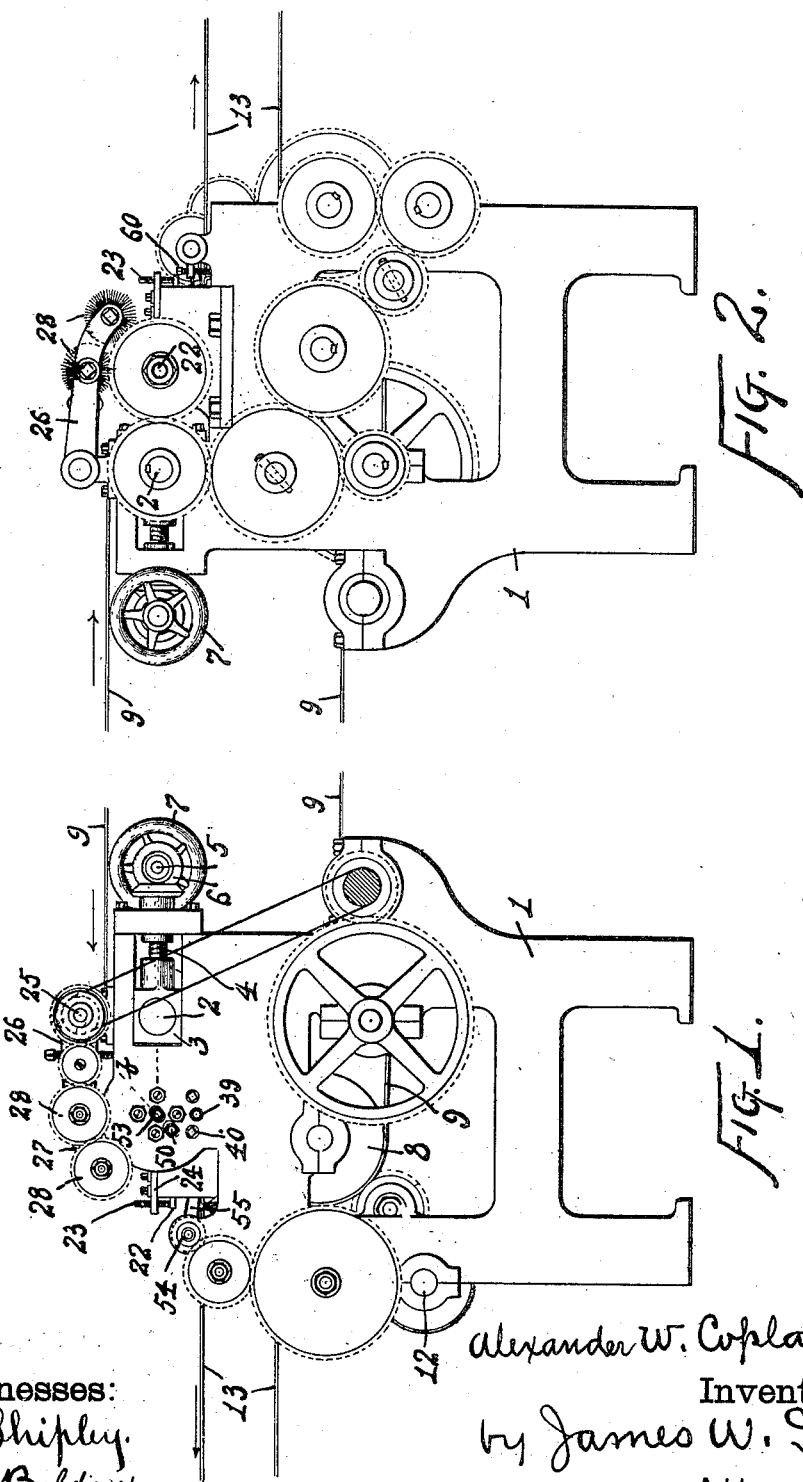

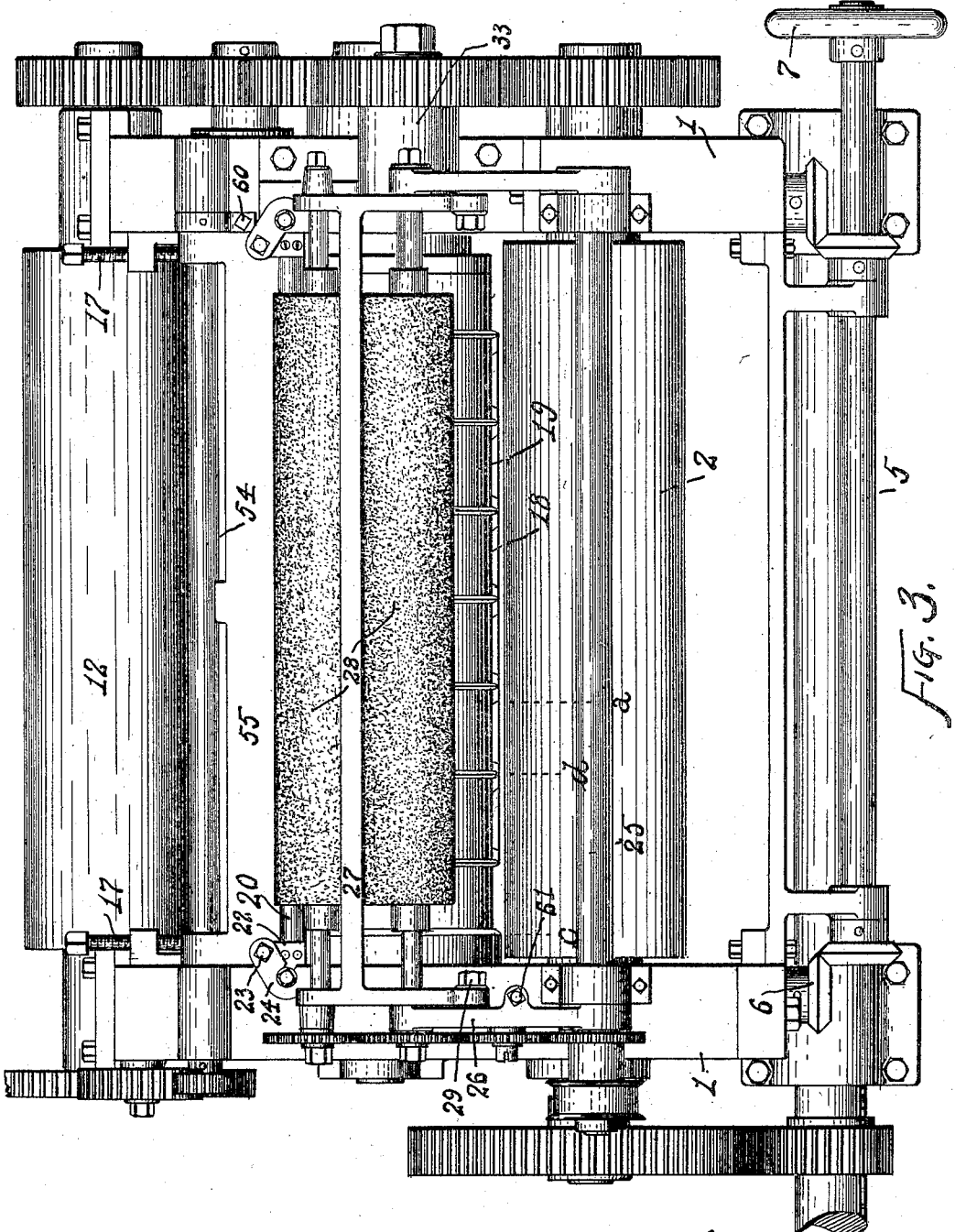

No. 705,040. Patented July 22, 1902.
A. W. COPLAND.
CRACKER MACHINE.
(Application filed Oct. 31, 1901.)
(No Model.) 4 Sheets—Sheet 3.

Witnesses:
E. R. Shipley.
M. S. Belden.

Alexander W. Copland
Inventor
by James W. See
Attorney

No. 705,040. Patented July 22, 1902.
A. W. COPLAND.
CRACKER MACHINE.
(Application filed Oct. 31, 1901.)
(No Model.) 4 Sheets—Sheet 4.
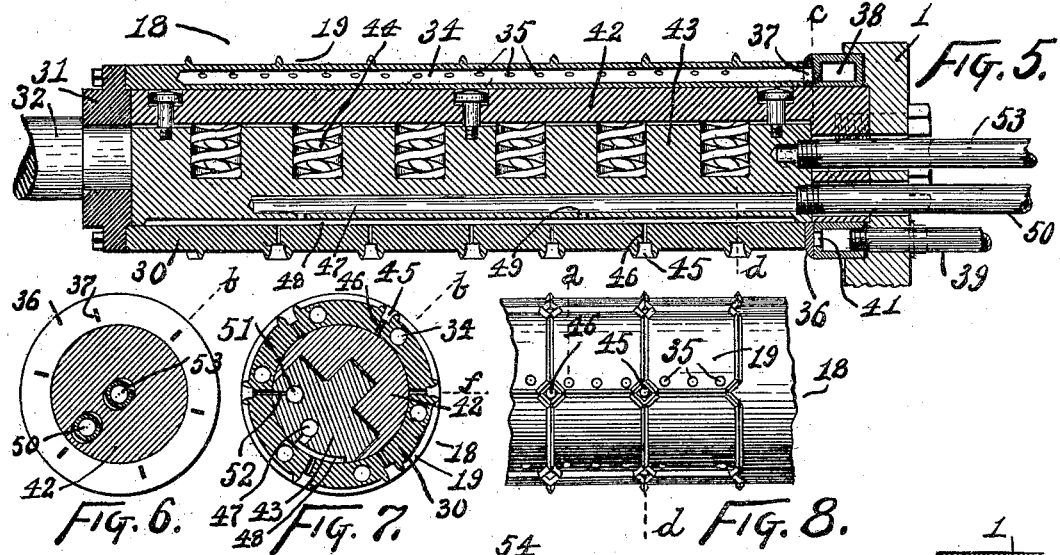
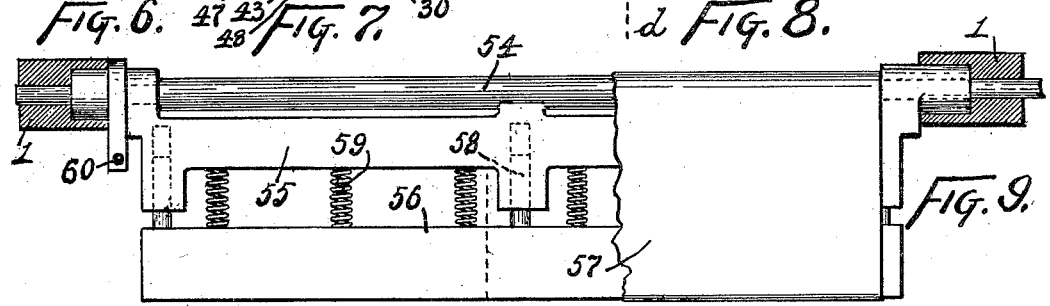
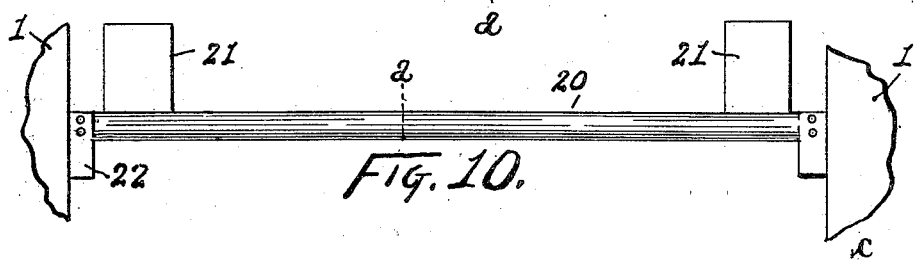
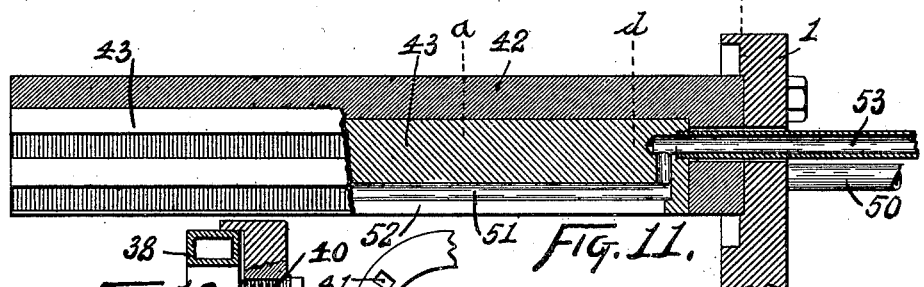
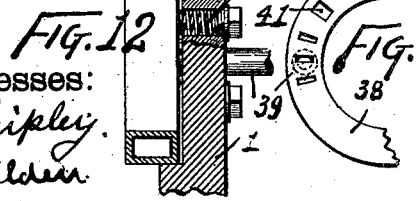
Witnesses:
E. R. Shipley.
M. S. Belden.
Alexander W. Copland
Inventor
by James W. See
Attorney

UNITED STATES PATENT OFFICE.

ALEXANDER W. COPLAND, OF CAMBRIDGE, MASSACHUSETTS.

CRACKER-MACHINE.

SPECIFICATION forming part of Letters Patent No. 705,040, dated July 22, 1902.

Application filed October 31, 1901. Serial No. 80,597. (No model.)

*To all whom it may concern:*

Be it known that I, ALEXANDER W. COPLAND, a citizen of the United States, residing in Cambridge, Middlesex county, Massachusetts, (post-office address No. 24 Irving street, Cambridge, Massachusetts,) have invented certain new and useful Improvements in Cracker-Machines, of which the following is a specification.
This invention, pertaining to a machine for cutting crackers from the sheet of dough, may be briefly described as an endless traveling apron, a rotary cutting-cylinder disposed across the same and cutting out the crackers and scrap as the dough is carried along by the apron, air-blast provisions in the cutting-cylinder by which the crackers are loosened in the cutter and partly discharged therefrom, air-blast provisions in the cutting-cylinder by which the scrap is discharged from the cylinder, air-suction provision in the cutting-cylinder to prevent premature discharge of the scrap, a stripping-apron to insure the redelivery of the discharging crackers to the canvas, strippers to strip the side scrap from the cutting-cylinder, rotary brushes cleaning the cutting-cylinder, and a transfer-apron for receiving the crackers from the main canvas and conveying them onwardly. Some of the features may be employed without the other features.

The invention will be readily understood from the following description, taken in connection with the accompanying drawings, in which—

Figure 1 is a side elevation of a cracker-machine embodying my invention; Fig. 2, a similar elevation of the opposite side; Fig. 3, a plan of the machine with the apron omitted;
Fig. 4, a vertical section in the plane of line *a* of Figs. 3, 9, 10, and 11; Fig. 5, a longitudinal section of the cutting-cylinder in the plane of line *b* of Figs. 1, 4, 6, and 7; Fig. 6, a transverse section of the cutting-cylinder in the plane of line *c* of Figs. 3, 5, and 11; Fig. 7, a transverse section of the cutting-cylinder in the plane of line *d* of Figs. 3, 5, 8, and 11; Fig. 8, a side elevation of a portion of the cutting-cylinder; Fig. 9, a bottom view of the main stripper; Fig. 10, a plan of the stripper for the side scrap; Fig. 11, a longitudinal section of the core of the cutting-cylinder in the plane of line *f* of Figs. 4 and 7, a portion of the core-segment appearing in elevation; Fig. 12, a section of the valve-box of the cutting-cylinder in the plane of line *f* of Figs. 4 and 7; Fig. 13, a face view of a portion of the valve-box.

In the drawings, giving present attention particularly to Fig. 4, but referring to other figures when needful, 1 indicates fixed frame parts forming, generally speaking, the two side members of the machine, these parts being adapted for the support of various rolls, &c.; 2, a roll journaled across the upper portion of the frame; 3, horizontally-sliding bearings for this roll; 4, screws for horizontally adjusting this roll; 5, a cross-shaft; 6, gearing connecting this cross-shaft with the adjusting-screws 4; 7, a hand-wheel on shaft 5, the arrangement being obviously such that by the turning of the hand-wheel the roll 2 may be shifted transversely in a horizontal direction; 8, a roll journaled across the machine below and in advance of roll 2; 9, an apron, to be endless, passing over rolls 2 and 8, this apron to lead from the usual gaging-rolls and to be properly supported on bearing-rolls, so as to carry the sheet of dough from the gaging-rolls to the mechanism now under consideration; 10, a cross-bar mounted in the frame and having a thin rounded forwardly-presenting edge, the apron on its way from roll 2 to roll 8 making a sharp turn over the front edge of this cross-bar, whereby the apron has a horizontal course as it approaches the edge of the cross-bar and then turns downward to roll 8; 11, a bolt-and-slot arrangement for permitting the vertical adjustment of cross-bar 10; 12, a pair of coacting rolls journaled across the frame in advance of roll 8; 13, a secondary apron engaging rolls 12; 14, a second cross-bar, similar to cross-bar 10, disposed across the machine within apron 13, so as to give to that apron a sharp turn as it passes from its vertical to its horizontal course, the two aprons practically meeting where they turn over the edges of their cross-bars; 15, pivots supporting the cross-bar 14, whereby that cross-bar may swing to and from cross-bar 10, so as to bring the two aprons very near to each other; 16, a bolt-and-slot arrangement for permitting the vertical adjustment of cross-bar 14, and 17 set-screws for adjusting cross-bar 14 to and from the other cross-bars.

The sheet of dough is brought forward from the usual sheeting and gaging rolls by apron 9 and while thereon is cut into crackers by the cutting apparatus to be described later, the cutting apparatus redelivering the crackers to the apron. When the crackers reach the position just beyond the edge of cross-bar 10, they become transferred to the secondary apron 13, which carries them onward for further disposition. The cutting apparatus employed in the present case cuts the crackers and redelivers them to apron 9 in such manner as to tend in many cases to cause more or less firm sticking of the crackers to the apron; but as this apron takes its abrupt turn over the edge of cross-bar 10 the crackers tend to peel upward at their forward edges, whereby they become stripped from apron 9 and transferred to and carried onward by apron 13, on which they lie lightly. The cross-bars 10 and 14 should be adjusted to fairly the same level, so as to bring the two aprons as close together as practicable.

Proceeding with the consideration of Fig. 4, 18 indicates the cutting-cylinder as a whole, which is disposed across the frame in advance of roll 2, apron 9 running under and in contact with the cutting-cylinder, the latter cutting against the apron where it passes between the cutting-cylinder and roll 2; 19, the cracker-compartments of the cutting-cylinder, the same being formed by beveled cutting edges projecting from the periphery of the cutting-cylinder and giving to the cracker-compartments such outline as is desired, the illustration showing, as best seen in Fig. 8, the cutting-cylinder as being arranged for the production of square crackers with the corners cut off at an angle of forty-five degrees; 20, a stripper-shaft disposed across the frame in advance of the cutting-cylinder; 21, stripping-fingers projecting rearwardly from this shaft and engaging upwardly against the periphery of the cutting-cylinder at the end extremities of the longitudinal series of cracker-compartments, so as to strip from the cutting-cylinder the strips of side scrap of dough and cause their redelivery to the apron; 22, arms projecting forwardly from shaft 20; 23, set-screws supported by the framing and engaging the arms 22 and serving as means for adjusting the rear ends of side strippers 21 into proper relationship to the periphery of the cutting-cylinder; 24, plates carrying the set-screws 23 and mounted on the framing by means of vertical pivots, permitting the set-screws to be swung sidewise out of the way, thus freeing the entire side-stripper construction; 25, a rock-shaft extending across the frame over and to the rear of the cutting-cylinder; 26, a pair of forwardly-projecting arms fast on this rock-shaft, one near each end of the cutting-cylinder; 27, a frame mounted between arms 26 and extending across over the cutting-cylinder, this frame being pivoted to the arms so that it may rock on an axis parallel with shaft 25; 28, a pair of cylindrical brushes mounted in frame 27 and extending along and in contact with the cutting-cylinder and arranged to be continuously rotated, and 29 a slot-and-bolt arrangement between frame 27 and arms 26, whereby the frame may be rocked in the arms.

As thus far described, it being understood that rotary motion will be properly imparted to the rolls and brushes, the properly-sheeted dough will be carried forward by apron 9 and be cut into crackers by the cutting-cylinder, the side scrap being stripped from the cutting-cylinder and redelivered to the apron, and thereby carried forward and delivered to the secondary apron 13, by which it is carried onward. The cutting-cylinder, by means hereinafter described, discharges the cut crackers again to apron 9 as that apron passes forward from the cutting-cylinder, the crackers leaving apron 9 and being carried onward by secondary apron 13 along with the side scrap. The scrap cut from between the crackers by the cutting-cylinder is retained by the cutting-cylinder for a time and ultimately discharged by means to be hereinafter described. The brushes rotating in contact with the cutting-cylinder keep the same clean and in good working condition. The brushes are held to the cutting-cylinder by their gravity and that of the frame which supports them, and the vigor of their contact may be adjusted by means of the set-screw 61 in one of the arms 26 and impinging against the main frame, whereby the descent of the brushes may be limited. By rocking frame 27 on the arms 26 and then securing it by means of bolts 29 the brushes may be adjusted so as to equalize their action upon the cutting-cylinder or so as to favor one of the brushes, if desired. The cutting is done by the cutting pressure of the cutting-cylinder against apron 9, where it passes downward between the cutting-cylinder and roll 2, and by the means heretofore described roll 2 may be adjusted transversely into active relationship to the cutting-cylinder.

The construction and working of the cutting-cylinder will now be described, reference being had to Fig. 4 and special reference being had to Figs. 5, 6, 7, 8, 11, 12, and 13. Referring to the just-mentioned figures of the drawings, 30 indicates the cylindrical shell of the cutting-cylinder, the same having an accurate cylindrical bore open at one end; 31, a flange rigidly secured to the opposite end of the shell; 32, a gudgeon fast in this flange; 33, a bearing separably supported by one of the side frames and supporting gudgeon 32; 34, a circumferential series of longitudinal air-passages in the shell of the cutting-cylinder; 35, ports leading outwardly from passages 34 into the cracker-spaces of the cutting-cylinder at the advancing portions thereof—that is to say, just to the rear of the longitudinal cutting-ribs—there being several ports in each of the cracker-spaces; 36, an annular flange secured against the open end of the shell of the cutting-cylinder over the open ends of longitudinal passages 34; 37, ports through this flange forming inlets to the passages 34; 38, a valve-box disposed between flange 36 and the nearer side frame of the machine and making rubbing contact against the outer face of the flange; 39, a compressed-air pipe leading into valve-box 38 from any suitable source of supply of air under pressure; 40, Figs. 1 and 12, springs urging the valve-box against flange 36, so as to maintain rubbing air-tight contact therewith as the cutting-cylinder turns, and 41 segmental ports in the inner face of the valve-box, adapted to be swept over in succession by the ports 37 in the flange of the cutting-cylinder as the cutting-cylinder rotates, whereby at and during proper times compressed air goes in succession to the passages 34 and thence to the cracker-spaces, the length of the series of ports 41 determining the length of time the air shall thus pass to the cracker-spaces and the angular position of the ports determining the time of beginning and cessation of such air-flow.

As the sheet of dough passes between the cutting-cylinder and roll 2 it becomes cut into crackers and scrap in an obvious manner and stays within the spaces of the cutting-cylinder, being held therein by the apron turning down and under the cutting-cylinder. As a longitudinal cutting-rib in its turn does its cutting, then, by the position of ports 41 in the valve-box, compressed air is admitted through the appropriate passage 34 and ports 35 to the cracker-spaces just in advance of that cutting-rib. The air-pressure behind the cracker tends to loosen and expel the cracker which, however, is still held in the cracker-space by the apron. This pressure also makes the cracker cling more firmly to the apron. The cracker in the cracker-space and the apron backing it and pressing against the cutting-edges of the cracker-space close the cracker-space, but do not make air-tight joints, so that when compressed air enters the cracker-space it commences to escape almost immediately. If while a cracker in the cutter is backed by the apron a number of quick pulsations of compressed air enter the cracker-space by reason of ports 37 sweeping over a series of narrow ports 41, the action may be described as "rapping" the cracker in its space and will have a tendency to loosen it from the cutting-ribs and any dockers and embossing-plates which may be employed. When the advancing edge of the cracker reaches a point immediately below the axis of the cutting-cylinder, then the apron begins to part company with the cutting-cylinder and the front edge of the cracker is at liberty to leave the cracker-space. If gravity and the clinging of the cracker to the apron is stronger than the tendency of the cracker to stay in its space, which tendency has been diminished by the use of compressed air, as previously described, then the cracker will peel from the cutter and follow the apron as the cutter and apron advance. To insure starting of the cracker from the cutter when the front edge of the cracker is at liberty to leave the cracker-space, compressed air is used in the cracker-space at this time to force the front edge of the cracker from its space. Preferably at this time, by means of a properly-placed port 41, a blast is let into the cracker-space against the front edge of the cracker, so as to have besides the pressure of the air the benefit of a column or a number of columns of air impinging against the inner front edge of the cracker. The crackers are thus started from the cracker-spaces to the main apron, from which, as heretofore explained, they are stripped and transferred to the secondary apron 13.

While the compressed air tends to displace the crackers, the apron prevents such displacement until the apron and cutting-cylinder begin to part company, the tendency of the air, however, having been to make the crackers follow the apron. When the front edge of the cracker has let the cracker-space, by reason of the opening produced, the use of compressed air to further detach the cracker is abandoned. The rearward portions of the crackers may in some cases cling to the cutting-cylinder with greater tenacity than to the apron, in which event there might be a tendency for the cutting-cylinder to pull the crackers up from the apron instead of nicely delivering them thereon. For this reason provision is made for positively stripping the crackers from the cutting-cylinder. This provision will now be described and in connection with a series of designating-numerals taken out of their numerical order. Reference may be had to Figs. 3, 4, and 9, principally Fig. 4, in which 54 indicates a rotary shaft disposed across the machine in advance of the cutting-cylinder and above the level of its lower portion; 55, a thin frame journaled on this shaft and extending across the machine and projecting tangentially toward the cutting-cylinder substantially parallel with the apron in front of the latter; 56, a separate rearward extension of this frame, its rear edge being thin and rounded and projecting as far as practicable into the space between the cutting-cylinder and the apron, but closer to the former, so as to permit room for the crackers below such edge; 57, an endless apron running on shaft 54 and the rear edge of frame 56; 58, sliding studs connecting frames 55 and 56 and permitting forward and rearward movement of the latter; 59, springs between the two frames, tending to move frame 56 rearward and keep apron 57 under tension, and 60 a set-screw in an arm on frame 55 and impinging against the general frame of the machine and serving as a means by which the rear edge of frame 56 may be delicately adjusted up and down.

The parts just described obviously constitute a stripper adapted to engage over the advancing edge of the cracker as it leaves the cutting-cylinder and insure the stripping of the entire cracker from the cutting-cylinder and its proper delivery to the carrying-apron. This would be the case were the stripper a non-traveling device; but it is not at all desirable to attack the upper surface of the dough cracker by means of a stationary stripper, which might tend to retard its advance. The under surface of apron 57 on the stripper moves at the same speed as the apron 9. Consequently the stripper in taking the cracker does so by a surface which is moving forward at the same speed as the cracker, thus avoiding any tendency to retardation and consequent mutilation or disarrangement. The rear edge of the stripping-apron 57, where it turns over the edge of frame 56, acts as would a small rotating roller similarly disposed; but the frame and apron arrangement described has the advantage of lending itself to the utilization of a cracker engaging a stripper portion much shallower than would be practically consistent with the employment of a simple rotary shaft.

The method and means by which the cutting-cylinder deals with the scrap cut from between the crackers will now be described. Referring further to the drawings, 42 indicates a stationary cylindrical core fitting within the bore of the shell of the cutting-cylinder and firmly supported against rotation by one of the side frames of the machine, this core virtually forming a large journal on which the cutting-cylinder has its bearing; 43, a loose segment of the core extending lengthwise thereof and capable of a trifle of radial movement therein, this segment having a tongue-and-groove fit in the core; 44, springs disposed between the back of the frame and the core and tending to press the segment outwardly into close air-tight contact with the bore of the shell of the cutting-cylinder, uniting-screws being preferably employed, as shown in Fig. 5, to connect the core and the segment and prevent their improper separation when the cutting-cylinder is removed from the core; 45, the scrap-spaces of the cutting-cylinder; 46, ports leading radially outward through the shell of the cutting-cylinder into the scrap-spaces thereon; 47, a longitudinal passage in the segment of the core; 48, a segmental groove extending longitudinally in the outer surface of the segment and adapted to be swept over in succession by the longitudinal rows of ports 46; 49, openings leading from longitudinal passage 47 into groove 48, and 50 a suction-pipe connected with longitudinal passage 47 and adapted to be connected with an air-pump or other vacuum-producing agent.

At the time the apron 9 and the cutting-cylinder start to part company it might be that the scrap would tend to cling to the apron rather than to the cutting-cylinder. Segmental air-groove 48 is to be always under suction, and its angular disposition is such that it becomes effective through ports 46 as the scrap-spaces reach their lowermost positions and begin to rise from the apron. Under these conditions the suction acts to retain the scrap within the scrap-spaces of the cutting-cylinder, and the extent of width of the groove 48 is such as to continue this suction action until there is no further possibility of outward pull upon the scrap by the apron. The scrap will therefore be carried onward and upward by the cutting-cylinder.

Proceeding with the drawings, 51 indicates a second longitudinal passage in the segment of the core; 52, a longitudinal slot extending from this passage outwardly to the bore of the cutter-cylinder, preferably in about the horizontal plane of the axis of the cutting-cylinder, and 53 a compressed-air pipe connected with passage 51.

As the ports 46 pass the slot 52 the compressed air will enter the scrap-spaces behind the scrap and forcibly expel the scrap outwardly, where it may be received in any suitable trough or catching device.

It is of course to be understood that rotary motion at proper speed is to be given to the rolls, the cutting-cylinder, the brushes, and the heel-shaft of the apron-stripper. The provision of transmitting mechanism by which this may be done is a matter of mere engineering, subject to almost infinite variation and hardly calling for exemplification. I have, however, illustrated in the drawings gearing, belts, &c., suitable for the purpose of obvious construction and calling for no description.

It is to be noticed in Fig. 5 that the pipes 50 and 53, which connect with the longitudinal passages in the segment of the core, pass through the fixed head of the core and are screwed into the end of the segment. The segment is subject to some radial motion. Consequently the pipes pass through slots or enlarged openings in the head of the core, so as to permit of their necessary transverse motion. As the cutting-cylinder turns upon the core the outward pressure of the segment under the influence of the springs maintains a good valvular air-tight fit between the outer surface of the segment and the inner surface of the shell of the cutting-cylinder.

It is of course to be understood that the form or outline of the crackers may be varied to any desired extent, the illustration showing a merely exemplifying form. Again, it is common to decorate crackers by means of dockers, embossing-type, &c., placed within the spaces of the cutter to act on the dough at the time the cutting takes place. I have shown none of these devices upon my cutting-cylinder, but it is of course within the contemplation of my invention that these common and usual features will be availed of, if desired.

It should be here stated that in my machine the crackers dwell in the cutting-spaces an unusually long time, which long-continued dwell will improve the action of such embossing device as may be provided upon the cutter, and thus cause much nicer work than results from the usual quick contact in a reciprocating cutter.

I claim as my invention—

1. In combination a cylindrical cutter whose cutting-ribs outline spaces thereon; an apron coacting therewith; and supports for that apron to hold the apron in wrapping circumferential contact with the cylindrical cutter.

2. In combination a cylindrical cutter whose cutting-ribs outline spaces thereon and an apron moving therewith and having wrapping contact about a portion of the periphery of the cylindrical cutter and acting to hold the material in the spaces outlined by the cutting-ribs.

3. In combination a cylindrical cutter; a traveling apron having wrapping contact with a portion of the periphery of that cutter; air-passages communicating with the spaces outlined by the cutting-ribs of the cylindrical cutter; and means for supplying compressed air to those spaces.

4. In combination a cylindrical cutter; a traveling apron having wrapping contact with a portion of the periphery of that cutter; air-passages communicating with the spaces outlined by the cutting-ribs of the cylindrical cutter; and means for supplying compressed air to those spaces when only partly covered by the apron.

5. In combination a rotary cutting-cylinder provided with cutting-ribs outlining spaces thereon and having compressed-air passages communicating with such spaces, a traveling apron having wrapping contact with a portion of the periphery of such cutting-cylinder and adapted to engage the outer surface of crackers while their inner surface is subjected to air-pressure, and mechanism for controlling the flow of air to said passages.

6. In combination a rotary cutting-cylinder provided with cutting-ribs outlining spaces thereon and having compressed-air passages communicating with such spaces, a coacting roll contiguous to such cutting-cylinder, a traveling apron passing between said roll and cutting-cylinder and then following in contact with the cutting-cylinder and then leaving the cutting-cylinder, and mechanism for controlling the flow of air to said passages.

7. In combination a rotary cutting-cylinder provided with cutting-ribs outlining cracker-spaces thereon and having compressed-air passages communicating with such spaces, a traveling apron having contact with the periphery of the cutting-cylinder for a distance equal to the circumferential dimension of one of said cracker-spaces and then leaving the cylinder, a conduit for conveying compressed air to said passages, and valvular mechanism for admitting compressed air to the cracker-spaces before the apron separates from the cutting-cylinder.

8. In combination, a cylindrical cutter provided with cutting-ribs outlining spaces thereon, a thin-edged support disposed near the periphery thereof in stripping position, and an endless apron traveling over said thin edge and having that portion of its surface nearest the cutter traveling in a direction opposite that of the contiguous portion of the cutter.

9. In combination a cylindrical cutter provided between its end portions with cutting-ribs outlining spaces thereon; means for clearing the crackers from those spaces; and strippers presenting at the end portions of the cutter for stripping the side scrap from the ends thereof.

10. In combination, a cylindrical cutter provided with cutting-ribs outlining spaces thereon, a rocking frame mounted on an axis of oscillation parallel with the axis of said cutter, and a cylindrical brush mounted in said rocking frame and engaging the periphery of said cutter.

11. In combination a cylindrical cutter with cutting-ribs outlining spaces thereon; exhaust-passages communicating with one or more of said spaces; and means for controlling the flow of air from said spaces.

12. In combination a cylindrical cutter with cutting-ribs outlining spaces thereon; air-passages leading to some of such spaces; a conduit adapted to place said air-passages in communication with air-exhausting means; a conduit adapted to place said air-passages in communication with a source of supply of air under pressure, and valvular mechanism adapted to place said air-passages in communication with said first-mentioned conduit and subsequently in communication with the last-mentioned conduit.

13. In combination a rotary cutting-cylinder provided with cutting-ribs outlining spaces thereon and having a cylindrical bore and having air-passages leading from said bore to said spaces, a fixed cylindrical core engaging said bore and having air-passages adapted to communicate with the air-passages in said cylinder as the cylinder turns, a moving surface coöperating with said cylinder to carry the sheet of dough to it and against which the cylinder does its cutting, and an exterior conduit communicating with the air-passages in said core.

14. In combination a rotary cutting-cylinder provided with cutting-ribs outlining spaces thereon and having air-passages communicating with such spaces and having a cylindrical bore, a longitudinally-grooved cylindrical core engaging said bore, a segment of said core disposed within said groove, springs within said core urging said segment outwardly against the bore of said cylinder, air-passages in said segment adapted to communicate with the air-passages in said cylinder as the cylinder turns, and an exterior conduit communicating with the air-passage in said core.

15. In a cracker-machine, a cylindrical cutter provided with cutting-ribs outlining spaces thereon and having a circumferential series of independent longitudinally-extending air-passages near its periphery and having radial passages extending outwardly from said longitudinal passages to said spaces, and a valvular device for controlling communication successively with a portion of each of said longitudinal passages.

16. In combination, a rotary cutter provided with ribs outlining cutting-spaces thereon, a support to retain the cut dough in said spaces, and means for loosening the cut dough in said spaces while retained therein by said support.

17. In combination, a rotary cutter provided with ribs outlining cutting-spaces thereon, an opposing agent against which said cutter may act in cutting dough to become lodged in said spaces, a support to retain the cut dough in said spaces, and pneumatic means for loosening the cut dough in said spaces while retained therein by said support.

18. In combination, a rotary cutter having ribs outlining cutting-spaces thereon, an opposing agent against which said cutter may act in cutting dough to become lodged in said spaces, air-passages communicating with the spaces behind the dough therein, means for exhausting the air beneath the dough in said spaces, and means for subsequently ejecting the dough from said spaces.

19. In combination, a rotary cutter provided with ribs outlining cutting-spaces thereon, an opposing agent against which the cutter may act in cutting dough to be lodged in said spaces, air-passages in the cutter leading to the spaces behind the dough, and valvular means for admitting the air-supply to different spaces at different points in the rotation of the cutter.

ALEXANDER W. COPLAND.

Witnesses:
WILLIAM A. COPELAND,
LEPINE HALL RICE.